UNITED STATES PATENT OFFICE.

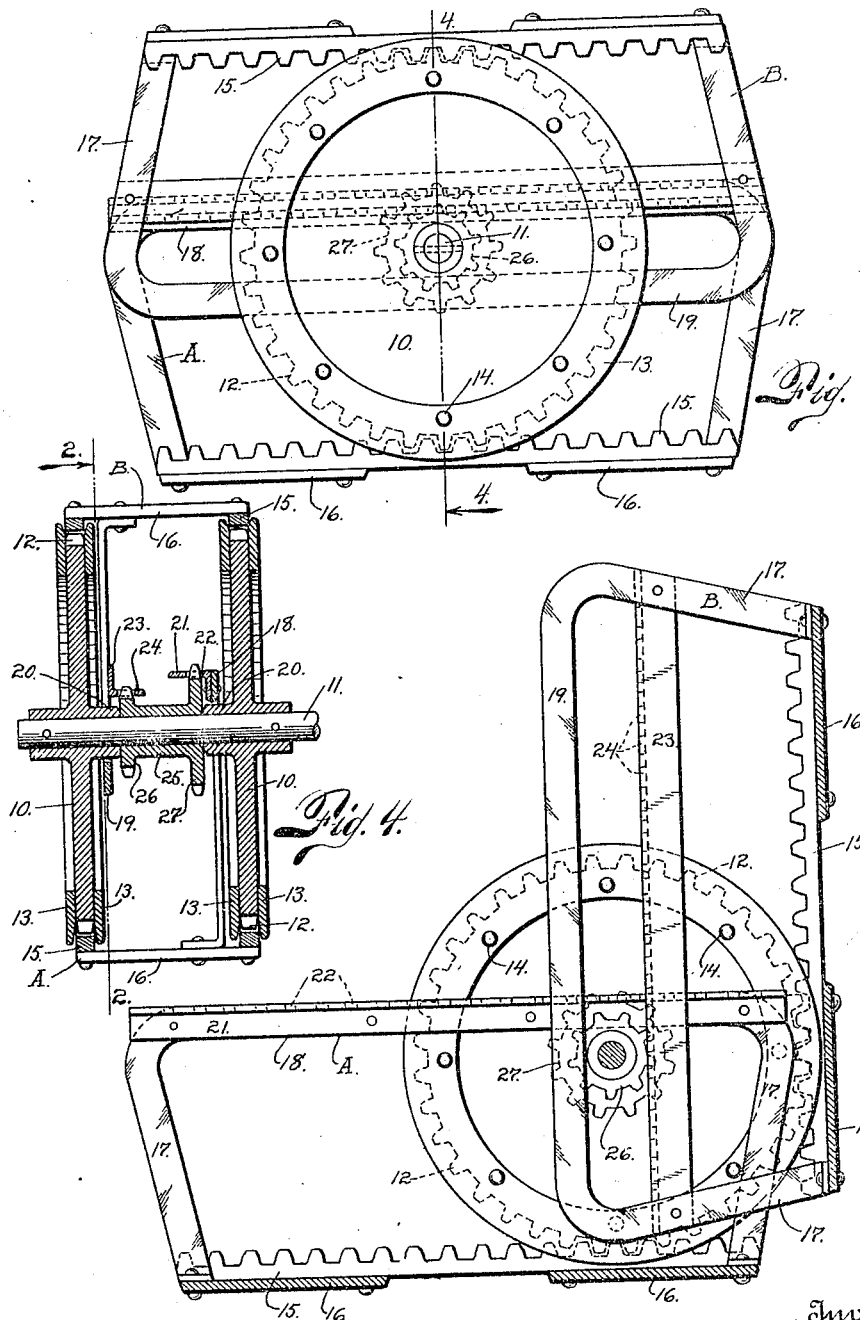

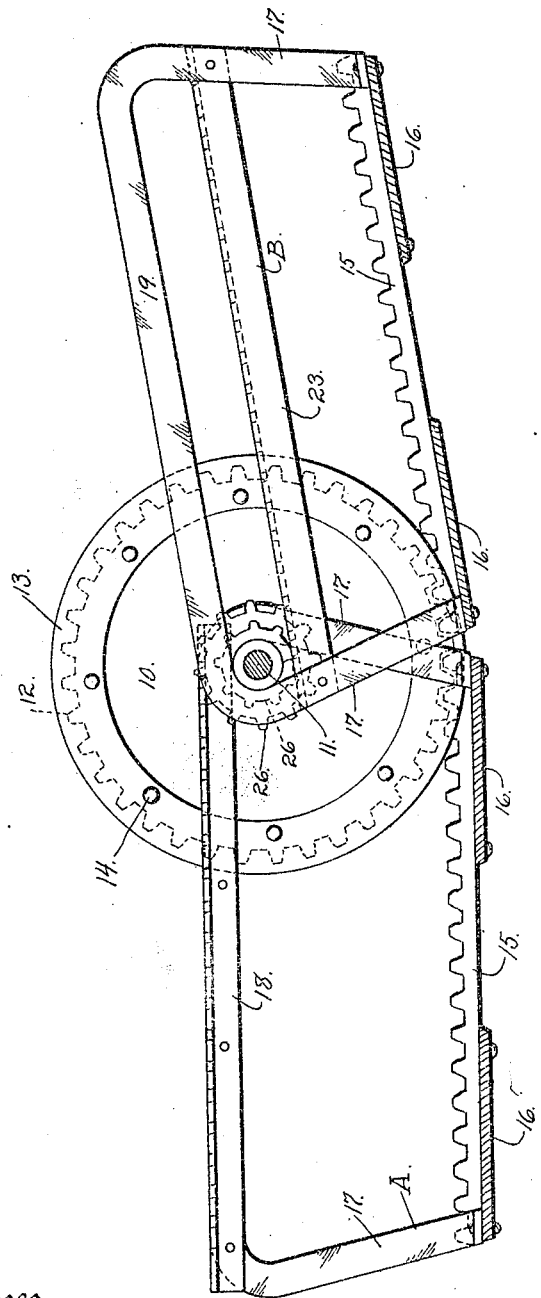

VACTOR G. GARNETT, OF FOWLER, COLORADO.

TRACK-LAYING WHEEL.

1,292,751. Specification of Letters Patent. Patented Jan. 28, 1919.

Application filed April 29, 1918. Serial No. 231,318.

*To all whom it may concern:*

Be it known that I, VACTOR G. GARNETT, a citizen of the United States, and a resident of Fowler, in the county of Otero and State of Colorado, have invented a certain new and useful Improvement in Track-Laying Wheels, of which the following is a full, clear, and exact description.

My invention is an improvement in wheels of the type which carry and lay a substantially continuous track, on which track the wheel is adapted to roll. While of general applicability wherever devices of this character are used my device is especially adapted for use on artillery, agricultural implements used on soft ground, and in children's toys. The object of the invention is the provision of a device of the character described which involves a minimum number of parts, which is simple and economical to construct and which operates with a minimum of friction. Further and more particular objects and advantages of my invention will later appear from this specification.

In the two sheets of drawings accompanying this application and forming a part hereof—

Figure 1 is a side view of a wheel constructed according to my invention, the parts being illustrated in the position assumed when the wheel has rolled half way over one track section;

Fig. 2 is a vertical section through my device taken on the plane 2—2 of Fig. 4, and illustrating the parts at the end of three-fourths of the travel of the wheel over one track section;

Fig. 3 is a view similar to Fig. 2 but showing the parts at the end of the travel over a track section; and Fig. 4 is a vertical section on the plane 4—4 of Fig. 1.

Referring to the drawings, in which like characters of reference designate like parts in the several views, it will be seen that my wheel is composed of a pair of disks 10 each non-revolubly mounted on an axle 11. In the preferred form shown in the drawings the disks 10 are solid and they are provided on their peripheries with gear teeth 12 and with flanges 13. There is preferably a flange 13 on each side of each disk and the flanges may be secured in position by bolts or rivets 14 which pass through the disks.

Two sets of track members A and B are provided for each wheel, each track member comprising a pair of tracks 15 which have rack teeth on their inner faces adapted to mesh with the gear teeth 12 on the wheel disks. Each pair of tracks is joined at a plurality of places by transverse braces 16 which also serve as ground or tread plates and each track member comprises a U-shaped yoke whose arms 17 are connected at their open ends to the respective end braces 16 of its track member. The arms 17 are of such length that the bases 18, 19 of the track members A and B pass on the side of the axle 11 opposite to that occupied by the tracks of the respective track members and lightly engage the hubs 20 of the adjacent wheel disks.

The base member 18 of the yoke of the track member A carries rigidly mounted thereon an angle plate 21 which has rack openings 22 in its horizontal flange. The base member 19 of track member B is not provided with such an angle plate but an angle plate 23 is secured to its arms 17 on the side of the axle 11 opposite to the base member 19. This angle plate 23 has rack openings 24 in its horizontal flange.

Revolubly mounted on the axle 11 there is a drum 25, which may be conveniently held against lateral displacement by a proper proportioning of the lengths of hubs 20. This drum carries integral therewith a pair of gears 26, 27, the gear 26 being the smaller and adapted to mesh with the rack 24, whereas the gear 27 is adapted to mesh with the rack 22.

Operation.

I will describe the operation of my device, starting with the parts in the position shown in Fig. 1 and assuming that the direction of travel is toward the right in all figures. The track member A is now lying on the ground and this track member constitutes the only stationary part of the device. The wheel rolls on the track racks of A and the axle 11 has a motion of translation to the right. The drum 25 is thus carried forward and the engagement of the gear 27 with the rack 22 imparts a counter clockwise rotation to the drum. Since the gears and drum are integral the gear 26 also rotates in a counter clockwise direction and this results in feeding the rack 24 toward the left in Fig. 1 or upward in Fig. 2, the engagement of the track racks of B with the wheel disk gear teeth causing the track racks of track member B to have a travel relative to the wheel and in a clockwise direction thereon. It will therefore be clear that when the wheel has revolved through 45 degrees from the position of Fig. 1 the parts will have substantially the position shown in Fig. 2 and that when it has revolved through ninety (90) degrees they will be in substantially the position shown in Fig. 3, with track member B about to lie on the ground and form the track and A about to be lifted off the ground and become the relatively movable member.

The tracks are of a length substantially equal to one half the circumference of the wheel, though they may be a trifle shorter as illustrated in the drawings. If they are, as illustrated, a trifle shorter than half the circumference the movement after the arms 17 contact with the hubs will be that of a rigid body rolling about the axis of 11 until A is lifted from full contact with the ground and B comes into such contact. After that time the rolling action on the tracks will be resumed. It will be obvious that if desired the tracks may be considerably shorter; but in that case I prefer to provide the vehicle with a pair of my wheels on each side, the angularity of set of these being so chosen that one wheel is in the position shown in Fig. 1 while the other is passing through the Fig. 3 position.

The operation of the device while rolling on track member B is substantially the same as that previously described, with the exception that the direction of rotation of the drum 25 is reversed, being clockwise in this position as opposed to counter clockwise when the track member A is down.

As previously stated the gears 26 and 27 vary in size and this is on account of the variation in distance of their respective drum racks from their respective track racks, one drum rack being on the same side of the axle as its track rack and the other being located on the side of the axle opposite to its track rack. Since the distance from track rack to drum rack is the lever arm for the movement of track member about main wheel and since this movement for both track members must be at the same angular speed, the diameter of the small gear is to the diameter of the large gear as the distance of the nearer drum rack from its track rack is to the distance of the farther drum rack from its track rack.

As a further aid in constructing the device I may state that the track rack lengths should substantially equal the inner dimensions of the yoke at the bends less the diameter of the hub of the drum or other element with which the yoke arms 17 contact in the Fig. 3 position.

While I have described in detail the most desirable embodiment of my invention now known to me, it will be obvious that many changes in details and specific arrangement of parts may be made without departing from my invention and I do not desire to be considered as limited to the precise embodiment shown and described.

Having thus described my invention what I claim and desire to secure by Letters Patent is:

1. In a device of the class described, an axle, a wheel on said axle, track members geared to the periphery of said wheel, a drum rack carried by each track member, a gear on said axle for each drum rack, said gears being fixed together, and means for driving said gears in alternating rotary direction.

2. In a device of the class described, an axle, a wheel on said axle, a pair of track members geared to the periphery of said wheel, each track being of a length substantially equal to one half the periphery of the wheel, a drum rack carried by each track member, a gear on said axle for each drum rack, said gears being fixed together, and means for driving said gears in alternating rotary direction.

3. In a device of the class described, an axle, a wheel on said axle, a pair of track members geared to the periphery of said wheel, each track being of a length substantially equal to one half the periphery of said wheel, a drum rack carried by each track member, and a drum revolubly mounted on said axle, said drum carrying fixed thereto a gear in operative relation to each of said drum racks.

4. In a device of the class described, an axle, a wheel on said axle, a pair of track members geared to the periphery of said wheel, each track being of a length substantially equal to one half the periphery of said wheel, a drum rack carried by each track member, said drum racks being located with relation to their respective track racks, on opposite sides of said axle, and a drum revolubly mounted on said axle, said drum carrying fixed thereto a gear in operative relation to each of said drum racks.

5. In a device of the class described, an axle, a wheel on said axle, a pair of track members geared to the periphery of said wheel, each track being of a length substantially equal to one half the periphery of said wheel, a drum rack carried by each track member, said drum racks being located, with relation to their respective track racks, on opposite sides of said axle, a drum revolubly mounted on said axle, and a large gear and a small gear fixed to said drum, the larger of said gears being adapted to coöperate with the drum rack which is relatively more remote from its corresponding track and the smaller of said gears being adapted to coöperate with the drum rack which is relatively closer to its corresponding track.

6. In a device of the class described, an axle, a wheel on said axle, a pair of track members geared to the periphery of said wheel, each track being of a length substantially equal to one half the periphery of said wheel, a drum rack carried by each track member, said drum racks being located, with relation to their respective track racks, on opposite sides of said axle, a drum revolubly mounted on said axle, and a large gear and a small gear fixed to said drum, the larger of said gears being adapted to coöperate with the drum rack which is relatively more remote from its corresponding track and the smaller of said gears being adapted to coöperate with the drum rack which is relatively closer to its corresponding track, the ratio between the diameters of said gears being equal to that between the distance of their respective drum racks from the respective corresponding tracks.

7. In a device of the class described, an axle, a pair of disks on said axle, said disks having their peripheries formed in gear teeth, a pair of track members, each track member comprising a pair of parallel rack tracks in engagement with the geared peripheries of said disks, a drum rack carried by each track member, said drum racks being located, with relation to their respective track racks, on opposite sides of said axle, a drum revolubly mounted on said axle between said disks, and a large gear and a small gear fixed to said drum, the larger of said gears being adapted to coöperate with the drum rack which is relatively more remote from its corresponding track and the smaller of said gears being adapted to coöperate with the drum rack which is relatively closer to its corresponding track.

8. In a device of the class described, an axle, a pair of disks on said axle, said disks having their peripheries formed in gear teeth, a pair of track members, each track consisting of a pair of joined parallel rack tracks and a U-shaped yoke secured to the opposite ends of the tracks and having its base passing on the opposite side of said axle, a drum rack carried by each yoke, said drum racks being located, with relation to their respective track racks, on opposite sides of said axle, a drum revolubly mounted on said axle between said disks, and a large gear and a small gear fixed to said drum, the larger of said gears being adapted to coöperate with the drum rack which is relatively more remote from its corresponding track and the smaller of said gears being adapted to coöperate with the drum rack which is relatively closer to its corresponding track.

9. In a device of the class describe, an axle, a pair of disks on said axle, said disks having their peripheries formed in gear teeth, a pair of track members, each track member consisting of a pair of joined parallel rack tracks and a U-shaped yoke secured to the opposite ends of the tracks and having its base passing on the opposite side of said axle, a drum rack carried by each yoke parallel with the corresponding track, said drum racks being located, with relation to their respective track racks, on opposite sides of said axle, a drum revolubly mounted on said axle between said disks, and a large gear and a small gear fixed to said drum, the larger of said gears being adapted to coöperate with the drum rack which is relatively more remote from its corresponding track and the smaller of said gears being adapted to coöperate with the drum rack which is relatively closer to its corresponding track.

10. In a device of the class described, an axle, a wheel on said axle, a pair of track members geared to the periphery of said wheel, a drum rack carried by each track member parallel to the track thereof, and a drum revolubly mounted on said axle, said drum carrying fixed thereto a gear in operative relation to each of said drum racks.

In testimony whereof I have hereunto affixed my signature.

VACTOR G. GARNETT.

Copies of this patent may be obtained for five cents each, by addressing the "Commissioner of Patents, Washington, D. C."